United States Patent
Grogan et al.

(10) Patent No.: US 9,475,098 B2
(45) Date of Patent: Oct. 25, 2016

(54) VAPOR RELIEF SCREEN BASKET CLEANING BRUSH AND METHOD

(71) Applicant: ANDRITZ INC., Glens Falls, NY (US)

(72) Inventors: Richard M. Grogan, Queensbury, NY (US); Tyson Bradford Hunt, Saratoga Springs, NY (US)

(73) Assignee: Andritz Inc., Glens Falls, NY (US)

( * ) Notice: Subject to any disclaimer, the term of this patent is extended or adjusted under 35 U.S.C. 154(b) by 730 days.

(21) Appl. No.: 13/911,145

(22) Filed: Jun. 6, 2013

(65) Prior Publication Data
US 2014/0007908 A1    Jan. 9, 2014

Related U.S. Application Data

(60) Provisional application No. 61/668,581, filed on Jul. 6, 2012.

(51) Int. Cl.
*B08B 1/00* (2006.01)
*A46B 13/00* (2006.01)
(Continued)

(52) U.S. Cl.
CPC ............ *B08B 1/002* (2013.01); *A46B 13/001* (2013.01); *B01D 29/643* (2013.01); *B01D 29/6415* (2013.01); *B01D 29/6423* (2013.01); *B01D 46/04* (2013.01); *D21C 11/06* (2013.01);
(Continued)

(58) Field of Classification Search
CPC ..... B08B 1/002; B08B 9/0808; B08B 9/087; B01D 45/18; B01D 46/04; B01D 65/02; B01D 2321/30; B01D 29/6407; B01D 29/6415; B01D 29/6423; B01D 29/643; A46B 13/001; A46B 2200/3006; A46B 2200/3073
See application file for complete search history.

(56) References Cited

U.S. PATENT DOCUMENTS 3,379,312 A * 4/1968 Brown ................... B01D 29/25
                                                         210/415
5,183,568 A * 2/1993 Lescovich ............ B01D 29/118
                                                         209/303
5,437,630 A * 8/1995 Daniel ............. A61B 17/32002
                                                         604/22

FOREIGN PATENT DOCUMENTS

KR          100768080 B1 * 10/2007
KR        20120128448 A  * 11/2012

OTHER PUBLICATIONS

Machine translation: Kim, J.; KR 20120128448; Nov. 27, 2012.*
(Continued)

*Primary Examiner* — Michael Kornakov
*Assistant Examiner* — Natasha Campbell
(74) *Attorney, Agent, or Firm* — Kerri Hochgesang; Robert Joseph Hornung

(57) ABSTRACT

A brush for dislodging impurities on steam relief screen basket within an operating vessel including at least one brush that includes an elongated support column with a brush attached to a first end of the elongated support column extends out of a seal located on a removable vessel cover of the vessel. The steps using the brush to dislodge impurities on steam relief screen basket include locating the brush comprised of a plurality of bristles adjacent to the steam relief screen basket, contacting the brush with the screen basket, extending the elongated support column through the seal, closing the removable vessel cover of the vessel to avoid pressure drop inside the vessel, and moving the brush from a first location on the screen basket to a second location on the screen basket to dislodge impurities attached to the screen basket.

12 Claims, 1 Drawing Sheet

(51) Int. Cl.
*B01D 46/04* (2006.01)
*B01D 29/64* (2006.01)
*D21C 11/06* (2006.01)

(52) U.S. Cl.
CPC *A46B2200/3006* (2013.01); *A46B 2200/3073* (2013.01)

(56) References Cited

OTHER PUBLICATIONS

Machine translation: Cha, D.; KR 10-0768080; Oct. 17, 2007.*

* cited by examiner

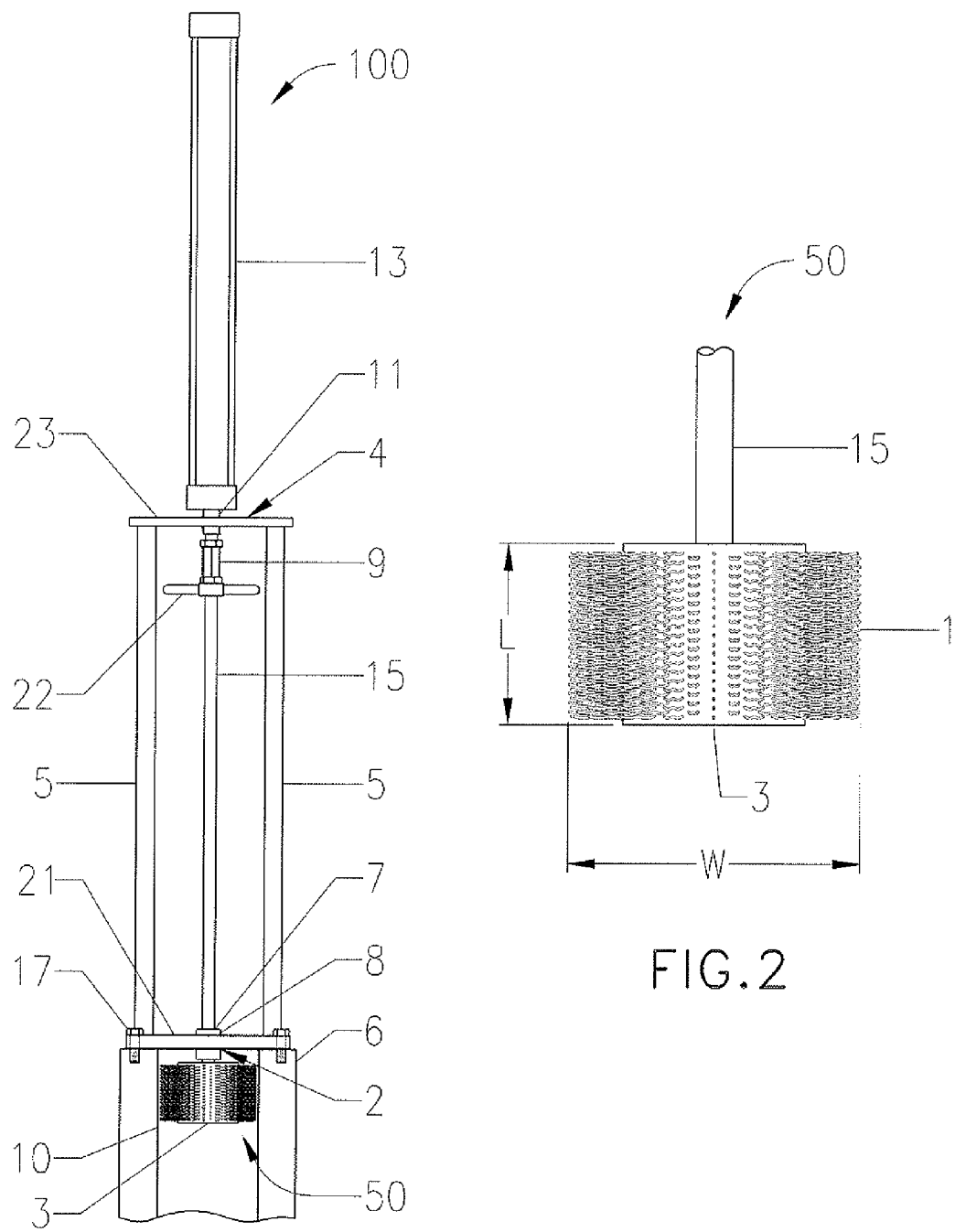

VAPOR RELIEF SCREEN BASKET CLEANING BRUSH AND METHOD

CROSS-REFERENCE TO PRIOR APPLICATION

This application claims the benefit of priority to U.S. App. No. 61/668,581 filed on Jul. 6, 2012, the entire content of which is incorporated herein by reference.

BACKGROUND OF THE INVENTION

In a conventional manufacturing process of pulp production from wood chips, flows of steam are inputted into various vessels. Due to the nature of the substrates present inside the vessel, such as wood chips and pulp, the steam that passes through the substrates will carry wood fibers and other light weight impurities that are not easily condensable. Consequently, the impurities will rise with the steam and other non-condensable gases, and attach to the screen basket or screen (also referred to as a strainer or a filter for use in any location where steam is being screened, strained or filtered) of a vessel, such as steam relief vessel, at the steam relief valve, creating clogs in the filtering or screening process. The steam is released through a steam relief vessel that contains a steam relief screen basket (screen basket) to filter out the impurities and fibers that arise with the steam and non-condensable gases before the vapor exits the vessel. The screen basket is typically located within a steam relief strainer (or steam relief chamber) within the vessel. The steam relief vessel is present in machines such as steaming vessels and chip bins used in the kraft pulping process. An example of a conventional screen basket used in such a practice is a steam relief strainer (usually cylindrical in shape) that is placed inside the steam relief vessel.

On a steam relief vessel, there is at least one exit steam relief valve in place that allows the steam to be released from the vessel. Conventional means of clearing a steam relief screen basket of impurities include shutting off the relief valve periodically, and releasing a burst of steam backward through the steam relief screen basket at a pressure higher than the pressure in the vessel. This practice is called the "steam blow-back method."

Conventionally, the blow-back steam is obtained through an extension of the steam pipe that supplies the steam to the vessel. The blow-back steam is at a pressure higher than the pressure in the vessel before it is released through the steam nozzles into the steam relief chamber. During the procedure, the steam relief valve is normally closed: no steam is relieved out of the vessel and the pressure is allowed to build up inside the vessel. Because of the pressure buildup from the closing of the relief valve and the pressured blow-back steam, the procedure is performed periodically and infrequently for a short period of time.

This blow-back action of the conventional method creates openings in a layer of impurities that collects on the screen basket, which temporarily clears part of the screen basket of impurities. The openings allow for further filtering until another layer of impurities builds up again on the screen basket surface. For example, such a cleaning procedure performed on the cylindrical steam relief screen basket would require numerous steam nozzles to be mounted on the steam relief chamber that houses the cylindrical screen basket. The blow-back steam would reenter the steam relief chamber through the steam nozzles, and create openings in the area of the screen basket that is directly in line with the steam nozzles. The openings allow for further filtering until the opening is covered with impurities, at which time yet another blow-back cycle must be initiated.

BRIEF SUMMARY OF THE INVENTION

Conventional filter cleaning methods are not efficient and are disruptive to the relief filtering process. The conventional procedure allows for the periodic cleaning of only a small area of the screen basket at a time, while other areas of the screen basket may not be cleaned at all. The screen basket becomes inefficient after a layer of impurities settles on the screen basket, even after periodic cleaning. Furthermore, periodic disruptions in the flow of steam through the steam relief vessel are caused by the shutdown of the steam relief valve during the cleaning process. Accordingly, there is a need for an improved screen basket cleaning method that will improve the screen basket effectiveness in the vessel without causing a disruption in the continuous manufacturing process of pulp production. It is to this end and other needs the present disclosure is directed.

A vapor relief steam cleaning brush (brush) has been conceived that addresses the above-discussed screen basket cleaning inefficiency by presenting an apparatus that is capable of cleaning an increased amount of a surface area of a screen basket in a single cycle. For example, the apparatus can be used to clean a cylindrical perforated screen basket in a steam relief vessel in a kraft pulping process. The apparatus can be utilized for any screen basket that filters solids and liquids from vapor and non-condensable gases to allow the vapor and non-condensable gases to pass through the screen basket. A cleaning method has also been conceived comprising moving a brush-like device with extended bristles to scrape the surface of a screen basket, such as a steam relief strainer screen basket. Movement of the bristles creates direct abrasion on the layer of impurities attached to the screen basket to detach the impurities. The brush contacts and cleans the entire surface of the screen basket rather than contacting and cleaning only specific areas of the screen basket that are directly in line with the steam nozzles, as is the drawback of conventional equipment and methods.

The brush as described herein does not require disruption of the vapor flow while the filter is being cleaned. An embodiment of the disclosed undisruptive method prevents the potential of excess pressure buildup during the cleaning process due to the vapor outlet being shut off. While the brush apparatus is in motion, the vapor is able to flow through the steam relief vessel continuously under a constant pressure. Furthermore, because the apparatus can operate without disrupting vapor flow, the apparatus can be operated as often as is desired to maximize filtering efficiencies. Nonetheless, the presently disclosed method does not preclude a conventional cleaning method. Another embodiment of the disclosed undisruptive method and apparatus allows for use to clean the screen baskets in non-pressurized vessels or even vessels operating under a vacuum.

The present disclosure is not limited to the exemplary models described, and can be modified in size, material, and design to accommodate other types of screen baskets used in a vessel that separate vapor and non-condensible gases from solids and liquids. These features, and other features and advantages of the present invention will become more apparent to those of ordinary skill in the art when the following detailed description of the preferred embodiments is read in conjunction with the appended figures.

BRIEF DESCRIPTION OF DRAWINGS

FIG. 1 is a diagram of an exemplary model of the apparatus presently disclosed.

FIG. 2 is an enlarged diagram of an exemplary embodiment for the brush part of the apparatus.

DETAILED DESCRIPTION OF AN EMBODIMENT(S) OF THE INVENTION

An exemplary embodiment of the apparatus 100, shown in FIGS. 1 and 2, includes at least one brush 50 which comprises a plurality of bristles 1, wherein the bristles 1 are connected to a first end 2 of an elongated support column 15. The brush 50 is enclosed inside a vessel 6, such as a steam relief vessel or other positively or negatively pressurized vessel or non-pressurized vessel, and situated inside a screen basket 10, such as a cylindrical perforated screen. One exemplary design of the brush 50 is such that the bristles 1 extend directly out of the elongated support column 15. Another exemplary design of the brush 50 is such that the bristles 1 extend out of a bristle housing 3, as shown in FIG. 2, which is operatively attached to the elongated support column 15 adjacent the first end 2. An exemplary length L of the brush 50 extending from the elongated support column 15 measured between the bottom of a lowest vertically located bristle and the top of a highest vertically located bristle is between about 10 inches to about 60 inches and all ranges in between depending upon the equipment size. Some examples of preferred ranges could include, but are not limited to, between about 20 inches to about 36 inches, or between about 36 inches to about 60 inches, or between about 10 inches to about 24 inches, or between about 10 inches to about 30 inches, as sized in accordance to a vessel. The brush 50, has a width W, measured horizontally from a bristle tip on one side of the elongated support column 15 to the bristle tip on an opposite side of the elongated support column 15, of between about 4 inches to about 48 inches and all ranges in between depending upon the equipment size. Some examples of preferred ranges could include, but are not limited to between about 8 inches to about 36 inches, or between 8 inches and 24 inches, or between 8 inches and 18 inches.

In all of the embodiments, the bristles' lengths are such that the bristles 1 are generally directly in contact with the screen basket 10 that the brush 50 is situated within. Exemplary embodiments of the brush 50 include conventional brushes known in the art and their various configurations. Exemplary embodiments of the bristles 1 extending out of the bristle housing 3 include, and are not limited to, a grid design that contains certain square surfaces without bristles, a spiral design that contains certain spiraled surfaces without bristles, a layered design that contains certain horizontal surfaces without bristles, and an equidistant design that contains bristles which are equally spaced on the surface of the bristle housing 3. Further exemplary designs stem from the bristle designs described above that may extend out directly from the elongated support column 15.

The bristles 1 may comprise a stiff non-corrosive type of material that can withstand a pressure up to about 35 pound-force per square inch gauge (psig), with a preferred pressure range of between about 0 psig to about 10 psig, or between about 10 psig to about 25 psig, or between about 10 psig to about 35 psig, or between about 15 psig to about 25 psig, or between about 25 psig to about 35 psig. The material preferably comprises, but is not limited to, steel, nylon, a stiff composite, a composite coated metal, or any combination of the above. Composition material for the brush 50 can vary depending upon the environment to which the brush 50 will be subjected. For example, an exemplary model of the apparatus 100 used to clean a steam relief strainer screen basket can comprise steel; another exemplary model subject to an acidic environment can comprise nylon bristles. An additional exemplary model of the apparatus 100 to be used to clean a steam relief strainer screen basket inside a chip bin can comprise a non-corrosive and non-static material such as a composite to avoid causing sparks.

The elongated support column 15, which has a second end 4 (opposite of the first end 2 that is adjacent to the brush 50), extends through a coupling 9 adjacent said second end. The elongated support column 15 also extends through a fixed cover 23, which is adjacent a transpositive assembly 13 at the second end 4. Opposite the second end 4, the elongated support column 15 extends at the first end 2 through an aperture 8 in a removable vessel cover 21. The aperture 8 is operatively sealed with seal 7 to maintain the constant pressure in the vessel 6 as well as preventing uncontrolled release of steam or impurities to the atmosphere while allowing the elongated support column 15 to provide brush movement inside the vessel 6. The seal 7 preferably comprises, but is not limited to, a flexible composite comprising a non-ferrous material such as molybdenum, a thermoplastic material such as polytetrafluoroethylene (PTFE), graphite, a composite of graphite and a metal, a ceramic, a tertiaryfluorohydrocarbon, or a combination thereof that is capable of enduring the frequent movement of elongated support column 15. The elongated support column 15 comprises a non-corrosive material that is able to endure the pressure of the vessel, and the pressure caused by the frequent movement of the brush to clean the screen basket 10 within vessel 6, without breaking.

The second end 4 of the elongated support column 15 is operatively and removably attached to the transpositive assembly 13 that provides the necessary movement for brush 50, and such that the transpositive assembly 13 can be removed from the elongated support column 15 as needed. Exemplary designs of the transpositive assembly 13 include conventional mechanisms known in the art that provide movement and their configurations. The exemplary movements of the elongated support column 15 can be one of vertical, horizontal, spiral, rotational, or a combination thereof. An exemplary transpositive assembly 13 can be, but is not limited to, one of a pressurized air cylinder, a steam powered cylinder, a hydraulic cylinder, a mechanical pulley, a lever system, an electrically driven assembly, or any combination thereof. The exemplary transpositive assembly 13 can also be automatic, manual, or a combination of both. The object of the transpositive assembly 13 is to provide movement to the brush 50 that allows the bristles 1 to graze the screen basket 10 and dislodge the layer of impurities.

The transpositive assembly 13 is situated above and supported by a support housing 5, wherein the support housing 5 comprises a first end at removable vessel cover 21 and a second end at fixed cover 23 opposite the first end. The second end of the support housing 5 is operatively connected to the transpositive assembly 13 at the fixed cover 23. The removable vessel cover 21 has a first side and a second side, the second side faces the brush 50 on the interior of the pressurized vessel chamber 6 and the first side is operatively attached to and contacts the support housing 5. The removable vessel cover 21 is operatively attached to the support housing 5 first end, such as, and not limited to, by being bolted. Bolts 17 are positioned to attach the removable vessel cover 21 to the support housing 5. A coupling 9 positioned on the elongated support column 15 second end allows the transpositive assembly 13 to be attached to elongated support column 15. In addition, guide 11, located above or near the coupling 9 ensures that the transpositive assembly 13 is positioned in line with the elongated support column 15 within support housing 5. A handle 22 is attached at an end of coupling 9 adjacent the second end 4 of elongated support column 15. Handle 22 allows the elongated support column 15 to be moved in a vertical direction manually, facilitating manual movement of the brush 50 against the screen basket 10. The handle 22 may be situated such that a person can manually operate the brush 50 to reach the screen basket 10 without opening the vessel 6.

An exemplary design of the support housing 5 could be either enclosed or open to the environment. The support housing 5 can be fabricated from a material such as a light weight metal that is able to hold the weight and force of the transpositive assembly 13 when the mechanical means provides movement to the elongated support column 15. An exemplary design comprises a tripod design with three metal legs that are bolted to the vessel's removable vessel cover 21 at the first end of the support housing 5. The second end of the support housing 5, which is directly opposite the first end mentioned above, removably supports the transpositive assembly 13.

In addition, each part of the apparatus 100 can be assembled and disassembled, as desired, to replace any fatigued parts, such as, but not limited to, the brush 50, the elongated support column 15, the seal 7, the support housing 5, and the transpositive assembly 13.

In yet another exemplary model of the apparatus 100, the elongated support column 15 is attached to a continuous mechanism to allow automatic operation of the elongated support column 15.

In addition, one embodiment of the screen brush apparatus 100 for dislodging impurities on steam relief screens within an operating vessel, such as an operating vessel in a kraft mill, has been conceived. The apparatus 100 comprises at least one brush 50, a vapor relief steam cleaning brush 50, an elongated support column 15 having a first end 2 and a second end 4, with the second end 4 opposite the first end 2; a bristle housing 3 operatively attached to the first end 2 of the elongated support column 15; a plurality of bristles 1 extending out of the bristle housing 3; a removable vessel cover 21 comprising a first side and a second side opposite the first side with an aperture 8 adjacent the first side; and at least one seal 7, the at least one seal 7 filling at least one aperture 8 of the removable vessel cover 21, wherein the elongated support column 15 extends through the at least one seal 7, and wherein the first end 2 of the elongated support column 15 faces the first side of the removable vessel cover 21, and the second end 4 of the elongated support column 15 faces the second side of the fixed cover 23 and is adjacent the transpositive assembly 13.

One embodiment of the screen brush apparatus 100 has a plurality of bristles 1 attached directly to the elongated support column 15 and the bristles 1 may be comprised of a steel, a nylon, a stiff composite material, a composite coated metal, or any combination thereof.

In another embodiment of the screen brush apparatus 100, the elongated support column 15 is comprised of a non-corrosive material and where the elongated support column 15 further comprises at least one handle 22 and can be operated manually or automatically (without the use of handle 22).

In an alternative exemplary embodiment, wherein the apparatus 100 is used in an environment where static electricity may be of concern, the apparatus 100 can be grounded or can comprise a non-static causing material.

In another embodiment, an apparatus 100 for dislodging impurities on steam relief screen basket 10 within an operating vessel 6, such as an operating vessel 6 in a kraft mill, the apparatus 100 comprises at least one brush, a vapor relief steam cleaning brush 50, and further comprises an elongated support column 15 having a first end 2 and a second end 4, with the second end 4 opposite the first end 2; a plurality of bristles 1 operatively attached to the elongated support column 15; a removable vessel cover 21 comprising a first side and a second side opposite the first side; and at least one seal 7, the at least one seal 7 filling at least one aperture 8 of the removable vessel cover 21, wherein the elongated support column 15 extends through the at least one seal 7, and wherein the first end 2 of the elongated support column 15 faces the first side of the removable vessel cover 21, and the second end 4 of the elongated support column 15 faces the second side of the removable vessel cover 21.

A method for dislodging or cleaning impurities on or attached to a steam relief screen basket 10 within an operating vessel 6 is disclosed herein, such as an operating vessel 6 in a kraft mill, the method comprising: removing a removable vessel cover 21 of a vessel 6; locating a steam relief screen basket 10 inside the vessel 6; locating a brush 50 adjacent to the steam relief screen basket 10, wherein the brush 50 comprises a plurality of bristles 1, and the brush 50 being operatively attached to a first end 2 of an elongated support column 15, the elongated support column 15 having a first end 2 and a second end 4; contacting the plurality of bristles 1 of the brush 50 with the screen basket 10; extending a first end 2 of the elongated support column 15 through at least one seal 7, the seal 7 filling at least one aperture 8 inside a removable vessel cover 21 of the vessel 6; and closing the removable vessel cover 21 of the vessel 6 to avoid pressure drop inside the vessel 6 and moving the brush 50 from a first location on the screen basket 10 to a second location on the screen basket 10 to dislodge impurities attached to the screen basket 10.

In one embodiment of the invention, the method includes moving in a back and forth motion between the first and the second location on the screen basket 10 a brush-like device with extended bristles 1 to scrape the surface of a filter, such as a steam relief strainer screen basket 10. Movement of the bristles 1 creates direct abrasion on the layer of impurities attached to the screen basket 10 to detach the impurities. The brush 50 contacts and cleans the entire surface of the filter rather than only contacting and cleaning specific areas on the filter that are directly in line with the steam nozzles, as is the major drawback of conventional equipment and methods. Movement of the brush 50 may be continuous. Additionally, movement of the brush 50 may be at least one of pivotal, vertical, horizontal, spiral, rotational, or a combination of these. The brush 50 may be moved manually, automatically, or a combination thereof.

It is to be understood that the present invention is by no means limited to the particular construction.

Apparatus and method steps herein disclosed or shown in the drawings also comprise any modifications or equivalents within the scope of the claims known in the art. It will be appreciated by those skilled in the art that the devices and methods herein disclosed will find utility with respect to multiple vessels of similar capabilities as disclosed in the exemplary embodiments for this disclosure.

The forgoing detailed description of the preferred embodiments is presented only for illustrative and descriptive purposes and is not intended to be exhaustive or to limit the scope and spirit of the invention. The embodiments were selected and described to best explain the principles of the invention and its practical applications. One of ordinary skill in the art will recognize variations can be made to the invention disclosed in this specification without departing from the scope and spirit of the invention.

What is claimed is:

1. An apparatus for dislodging impurities on a steam relief screen basket within an operating vessel comprising:
   a support housing, the support housing having a first end and a second end opposite to the first end, wherein the first end is operatively attached to a first side of a removable vessel cover;
   at least one brush, wherein the at least one brush comprises:
   an elongated support column having a first end and a second end opposite to the first end,
   a bristle housing operatively attached to the first end of the elongated support column, and
   a plurality of bristles extending out of the bristle housing;
   a transpositive assembly adjacent the second end of the elongated support column, wherein the transpositive assembly is operatively supported by the second end of the support housing, wherein the transpositive assembly is operatively and removably attached to the second end of the elongated support column, wherein the transpositive assembly comprises one of a pressurized air cylinder, a steam powered cylinder, a hydraulic cylinder, a mechanical pulley, a lever system, an electrically driven assembly, or any combination thereof, and wherein the transpositive assembly is operated automatically, manually, or a combination thereof;
   the removable vessel cover comprising the first side and a second side opposite of the first side, the removable vessel cover having an aperture; and
   at least one seal filling the aperture of the removable vessel cover, wherein the elongated support column extends through the seal, and wherein the first end of the elongated support column is adjacent the brush.

2. The apparatus of claim 1, wherein the apparatus is composed of a non-static causing material.

3. The apparatus of claim 1, wherein the apparatus is grounded.

4. The apparatus of claim 1, wherein the plurality of bristles are attached directly to the elongated support column.

5. The apparatus of claim 1, wherein the plurality of bristles are comprised of one of a steel, a nylon, a stiff composite, a composite coated metal, and a combination thereof.

6. The apparatus of claim 1, wherein the elongated support column is comprised of a non-corrosive material.

7. The apparatus of claim 1, wherein the seal comprises at least one of a flexible composite, the flexible composite comprising one of a non-ferrous material selected from a group consisting of: molybdenum, a thermoplastic material polytetrafluoroethylene (PTFE), graphite, a composite of graphite and a metal, a ceramic, a tertiaryfluorohydrocarbon and any combination thereof.

8. The apparatus of claim 1, wherein the elongated support column further comprises at least one handle.

9. The apparatus of claim 1, wherein the elongated support column is operated one of manually and automatically.

10. The apparatus of claim 1, wherein a length (L) of the brush extending from the elongated support column measured between the bottom of a lowest vertically located bristle and the top of a highest vertically located bristle is between about 10 inches to about 60 inches and all ranges in between.

11. The apparatus of claim 1, wherein the brush has a width (W) measured horizontally from a bristle tip on one side of the elongated support column to the bristle tip on the opposite side of the elongated support column is between about 4 inches to about 48 inches and all ranges in between.

12. An apparatus for dislodging impurities on a steam relief screen basket within an operating vessel, comprising:
   at least one brush, wherein the at least one brush comprises;
   an elongated support column having a first end and a second end, with the second end opposite the first end;
   a plurality of bristles operatively attached to the elongated support column;
   a removable vessel cover comprising a first side and a second side opposite the first side;
   at least one seal, the at least one seal filling at least one aperture of the removable vessel cover, wherein the elongated support column extends through the at least one seal, and wherein the first end of the elongated support column faces the first side of the removable vessel cover, and the second end of the elongated support column faces the second side of a fixed cover.

* * * * *